United States Patent Office

2,761,822
Patented Sept. 4, 1956

2,761,822

FINISHING TREATMENT FOR ACTIVATED CARBON

Leslie M. Addison, Baton Rouge, La., assignor to Esso Research and Engineering Company, a corporation of Delaware No Drawing. Application May 13, 1952,
Serial No. 287,600

7 Claims. (Cl. 196—147)

This invention concerns a novel process for the treatment of activated carbon to improve the adsorbing selectivity of the carbon. In accordance with this invention the non-adsorptive pore volume of an activated carbon is reduced. As a result the capacity of the carbon is reduced in a manner increasing the selective adsorptive capacity of the carbon. In accordance with this invention the selective adsorptive capacity of an activated carbon is increased by mechanical application of crushing stress or by deposit of blocking material in the macropores of the activated carbon.

At the present time a variety of methods are known for providing activated charcoal or activated carbon. In general, activated carbons are produced by the carbonization of a suitable organic material resulting in a coke-like product. This coke-like product can then be activated by a variety of treatments requiring reaction of the coke to change the surface characteristics of the material to provide a multitude of pores. By this means the surface of the coke is greatly increased so as to impart adsorptive characteristics to the coke providing what is called activated carbon.

For example, wood, coal or other natural occurring carbonaceous material may be carbonized to the form of a coke by heat treatment in the absence of air. In general, such materials are heated above about 800° F., or higher, in the absence of air in order to form coke. A coke like material may also be obtained from other materials. By way of example, an acid sludge obtained in the treatment of petroleum oils with sulfuric acid, sulfur trioxide or other sulfonating agents may be converted to coke. Acid sludges of this character as obtained from sulfuric acid treatment of gasoline, lubricating oils, or higher boiling petroleum distillates, for example, may be carbonized by contact with a mass of hot coke at a temperature which is preferably above about 600° F. This treatment serves to distill volatile matter present from the sludge after which the carbonized sludge may be transferred to a kiln where it is partially burned with air at a temperature of about 650° F. to 1200° F. The partial combustion serves to provide the necessary heat for the process and permits formation of a product known as petroleum coke.

Cokes of the character described may be activated by a variety of treatments. For example, a coke may be treated with steam at temperatures of about 800° C. or higher. Alternatively, combustion products, carbon dioxide, air or sulfur may be employed to activate coke.

The present invention is not concerned with the technique by which coke is obtained nor the method of activating this coke. The present invention is concerned with the treatment of activated carbon as obtained by any desired method. Thus, it is the purpose of this invention to provide a finishing treatment for an activated carbon, however obtained, so as to improve the properties of this activated carbon.

The present invention is based on the discovery that liquid held within the pores of an activated carbon may be said to consist of two parts. A first portion of the liquid will be of the same composition as liquid in which the activated carbon may be immersed. It may be considered that this portion of the liquid is contained within the larger openings of the activated carbon or in the macropores of the carbon. A second portion of the liquid held by carbon will however have a different composition than the external liquid, containing principally one or more strongly adsorbed components. Recognizing these facts, a term "selective adsorptive capacity" may be employed. The selective adsorptive capacity hereinafter referred to as $a$ may be expressed in cc. per gram of char for a binary mixture by the following expression:

$$a = \frac{V}{m} \frac{(x_0 - x)}{(1 - x)}$$

$V$ = volume of liquid mixture
$m$ = grams of char
$x_0$ = volume fraction of more strongly adsorbed component in original liquid
$x$ = volume fraction of more strongly adsorbed component in external liquid at equilibrium The selective adsorptive capacity of an activated carbon as defined above differs from what may be called the "internal capacity" of the activated carbon. In this sense the internal capacity of the carbon may be defined as the cc. per gram of char of a liquid which the activated carbon will adsorb from saturated vapors of the pure liquid.

Using these expressions, it may be said that the "non-adsorptive capacity" of an activated carbon is the difference between the "internal capacity" of the carbon and the "selective adsorptive capacity."

It is the purpose of this invention to decrease the non-adsorptive capacity of an activated carbon without altering the selective adsorptive capacity of the carbon. In other words it is the purpose of this invention to reduce the internal capacity of the activated carbon in a manner which only affects the non-adsorptive capacity of the carbon as distinguished from the selective adsorptive capacity of the carbon.

It is apparent on consideration that affecting an activated carbon in this manner results in an improvement in the selectivity of adsorptive separations attained by use of the activated carbon. This selectivity of separation may be referred to as the separation factor $\alpha$ in which the separation factor $\alpha$ is defined as:

$$\alpha = \frac{\dfrac{X \text{ adsorbate}}{Y \text{ adsorbate}}}{\dfrac{X \text{ external liquid}}{Y \text{ external liquid}}}$$

where X and Y are volume fractions of components A and B respectively. Adsorbate refers to the total liquid held in the char and is equal in volume to the internal capacity.

This separator factor may be calculated from the selective adsorptive capacity and the internal capacity of the activated carbon formerly defined. Thus, the separation factor $\alpha$ may be calculated as:

$$\alpha = \frac{a + (c - a)x}{(c - a)x}$$

where $a$ equals the selective adsorptive capacity, $c$ equals the internal capacity and $x$ equals the volume fraction of more strongly adsorbed component in the external liquid at equilibrium.

The foregoing observations may be readily visualized by considering the adsorptive capacity of a char to include both micropores and macropores. Apparently, adsorptive separations are produced by the formation of a surface layer of absorbate on the activated char. The surface layer of adsorbate, containing a larger number of one type of molecule than the external liquid, will cause appreciable separation in the micropores of the activated carbon. However, sufficient volume for liquid exists in the macropores so that the adsorbed surface layer in this region has substantially no effect on the total molecular composition of the liquid in the macropores. Consequently, with this mechanism in mind, it can be appreciated that the adsorption-separation characteristics of an activated carbon can be favorably affected by reducing the macropores of a carbon while not affecting the micropores. It is apparent that in this manner the non-selective adsorptive capacity of the carbon may be reduced so as to substantially improve the separation factor of the carbon.

The present invention achieves this result by a number of methods. For example, it is possible to reduce the non-adsorptive capacity of an activated carbon by mechanical crushing forces. Thus, by application of intense mechanical pressure ranging above about 20,000 lbs. p. s. i., it is possible to reduce the non-adsorptive capacity of a carbon. By way of example, in a typical experiment in which this was conducted, a mechanical pressure of 80,000 lbs. p. s. i. was employed. An activated char obtained from activation of coke derived from cocoanut shells was employed having an internal capacity of 0.46 cc. per gram, and having a selectivity factor of 2.72 for benzene from a 50–50 benzene-normal hexane solution. After application of this mechanical pressure it was found that the internal capacity of the activated carbon was reduced to 0.42 cc. per gram and the selectivity factor was increased to 3.00. It will be seen from this data that the pore structure of an activated carbon can be desirably altered according to the mechanism described by application of mechanical pressures.

The benefits of this invention can also be obtained in a preferred manner by a process resulting in the blocking or plugging of the larger or macropores of an activated carbon. For this purpose a high molecular weight organic material is preferably employed. By use of a high molecular weight organic material having a molecular weight above about 460, the material will be excluded from the micropores of the activated carbon, being retained in the larger pores of the carbon. On subsequently heating the treated carbon at temperatures above about 750° F. in the absence of air, the organic material may be carbonized so as to remove all distillable material. The resulting product will constitute an activated carbon having substantially the same selective adsorptive capacity, but having a reduced internal capacity corresponding to a reduction in the non-adsorptive capacity of the activated carbon. As indicated, by this mechanism, the macropores of the carbon are apparently selectively plugged.

This technique may also be valuably employed by dissolving a high molecular weight organic material in a low molecular weight aromatic solvent. In this connection, a heavy residual pitch obtained from the vacuum distillation of a petroleum oil may particularly be employed. This pitch, for example, may have a softening point of about 100° F., and may have a molecular weight ranging from about 400 to 4000. The pitch may be employed in treating an activated carbon by dissolving the pitch or dispersing the pitch in an aromatic solvent such as petroleum ether, benzene, toluene, or the like. Thereafter, the activated carbon to be treated may be immersed in the solution of the pitch. It is presently believed that the low viscosity aromatic solvent serves to penetrate the micropores of the activated carbon so as to protect these pores. The pitch material however will be retained, at least in part, in the macropores of the activated carbon. Consequently, on subsequently heating the activated carbon to carbonizing temperatures, the solvent will be distilled while permitting carbonization of the pitch in the macropores of the activated carbon.

As an example of this process, 45 grams of a steam activated cocoanut char was treated with a solution of 100 cc. of vacuum pipe still bottoms. The vacuum pipe still bottoms had the following inspections:

| | |
|---|---|
| Boiling range, °F | 1000+ |
| Gravity, °API | 10.7 |
| Conradson carbon, wt. per cent | 17 |
| Pour, °F | 105 |
| Viscosity, SSF @ 210° F | 396 |
| Carbon, wt. per cent | 87.27 |
| Hydrogen, wt. per cent | 11.30 |
| Sulfur, wt. per cent | 0.74 |
| Nitrogen, wt. per cent | 0.54 |
| Ash, wt. per cent | 0.48 |

The activated carbon and the pipe still bottoms were permitted to stand for a period of 16 hours, and the liquid was then removed by filtration and the charcoal heated until dry. The activated carbon was then heated to 1400° F. to eliminate any distillable material and to carbonize any constituents remaining in the activated carbon. It was found that the weight of the treated charcoal was 52.5 grams. The characteristics of this activated carbon are shown in the following table:

| | Total Adsorptive Capacity, cc./g. | Selective Adsorptive Capacity, cc./g. | α-Separation Factor for Octane isooctane mixture |
|---|---|---|---|
| Original Activated Carbon | 0.62 | 0.23 | 2.3 |
| Treated Activated Carbon | 0.43 | 0.23 | 3.6 |

It will be seen from this table that the treatment of the carbon was effective in increasing the separation factor of the carbon by about 150%.

As described therefore, this invention concerns a process for improving the separation factor of activated carbon. This is achieved by reducing the macropore volume or the non-selective adsorptive capacity of the activated carbon. As described, this may be achieved by selectively blocking the macropores of the carbon or by mechanically crushing the macropore structure. It may be noted that the process of this invention must be applied as the last or finishing step in the treatment of an activated carbon. Thus, for example, the benefits of this invention would be obviated by activation treatment applied after the processing described.

What is claimed is:

1. Process for the preparation of an improved activated carbon in which an activated carbon is contacted with a high molecular weight organic material and is thereafter heated at carbonizing temperatures.

2. The process defined by claim 1 in which the said high molecular weight organic material is contacted with the activated carbon in solution.

3. A process for the separation of a liquid hydrocarbon mixture containing components of differing molecular nature which comprises contacting the hydrocarbon mixture with an activated carbon prepared by treating an activated carbon with a high molecular weight organic material followed by heating of the said treated carbon at carbonizing temperatures.

4. In increasing the separation factor of an activated carbon the improvement which comprises contacting the activated carbon with a hydrocarbon treating agent having a molecular weight above about 460, and thereafter heating the said treated activated carbon to carbonizing temperatures whereby the internal capacity of the activated hydrocarbon is reduced and the selective adsorptive capacity is substantially the same.

5. The improvement defined by claim 4 in which the said hydrocarbon treating agent is a residual petroleum oil.

6. The improvement defined by claim 4 in which the said hydrocarbon treating agent is dissolved in an aromatic solvent.

7. An improved activated carbon obtained by contacting an activated carbon with a high molecular weight organic material and thereafter heating said material at carbonizing temperatures.

References Cited in the file of this patent

UNITED STATES PATENTS

| | | |
|---|---|---|
| 1,700,342 | Urbain | Jan. 29, 1929 |
| 2,008,148 | Morrell | July 16, 1935 |
| 2,423,702 | Hart | July 8, 1947 |
| 2,448,337 | Wickenden | Aug. 31, 1948 |
| 2,449,051 | Breth et al. | Sept. 14, 1948 |
| 2,470,339 | Claussen et al. | May 17, 1949 |
| 2,549,298 | Donegan | Apr. 17, 1951 |
| 2,586,889 | Vesterdal et al. | Feb. 26, 1952 |
| 2,635,709 | Archibald et al. | Apr. 21, 1953 |

OTHER REFERENCES

Mantell: Adsorption, first ed., McGraw-Hill Book Co., New York (1945), pages 158–9.